United States Patent

Hamada

[19]

[11] Patent Number: 5,867,790
[45] Date of Patent: *Feb. 2, 1999

[54] RADIO COMMUNICATION SYSTEM WITH ENHANCED CONNECTION PROCESSING

[75] Inventor: Masashi Hamada, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 508,309

[22] Filed: Jul. 27, 1995

[30] Foreign Application Priority Data

Jul. 28, 1994 [JP] Japan .................................. 6-176556

[51] Int. Cl.$^6$ ........................................................ H04B 7/00
[52] U.S. Cl. ............................ 455/115; 455/62; 455/509; 455/515
[58] Field of Search .................................... 455/33.1, 31.1, 455/32.1, 34.1, 36.1, 62, 509, 510, 511, 512, 514, 515, 516, 455, 528, 534, 450, 453

[56] References Cited

U.S. PATENT DOCUMENTS

| | | | |
|---|---|---|---|
| 4,672,601 | 6/1987 | Ablay | ........................................ 455/56 |
| 5,235,598 | 8/1993 | Sasuta | ...................................... 455/511 |
| 5,442,809 | 8/1995 | Diaz et al. | ............................... 455/511 |
| 5,515,366 | 5/1996 | Chieu et al. | ............................. 370/50 |

*Primary Examiner*—Reinhard J. Eisenzopf
*Assistant Examiner*—Darnell R. Armstrong
*Attorney, Agent, or Firm*—Morgan & Finnegan

[57] ABSTRACT

In a radio communication system, when an interconnection between radio terminal (PS) used for digital cordless telephones is performed, a connection destination terminal is discriminated in accordance with input information. If it s determined that the connection designation terminal is a terminal involved in the interconnection, a priority-monitor-target communication channel is figured out in accordance with a PS call number of the destination. When the priority-monitor-target communication channel is not used, transmission of call-origination control signal is started by using the idle priority-monitor-target communication channel. That is, the call-original control signal is transmitted by preferentially using the priority-monitor-target communication channel which is frequently monitored by the destination terminal.

40 Claims, 9 Drawing Sheets

| | PS1 SCAN PATTERN | PS2 SCAN PATTERN | PS3 SCAN PATTERN |
|---|---|---|---|
| 300 | PUBLIC CONTROL CH | PUBLIC CONTROL CH | PUBLIC CONTROL CH |
| 301 | PRIVATE CONTROL CH | PRIVATE CONTROL CH | PRIVATE CONTROL CH |
| 302 | SPEECH COMMUNICATION CH (01CH) | SPEECH COMMUNICATION CH (02CH) | SPEECH COMMUNICATION CH (03CH) |
| 300 | PUBLIC CONTROL CH | PUBLIC CONTROL CH | PUBLIC CONTROL CH |
| 301 | PRIVATE CONTROL CH | PRIVATE CONTROL CH | PRIVATE CONTROL CH |
| 302 | SPEECH COMMUNICATION CH (31CH) | SPEECH COMMUNICATION CH (32CH) | SPEECH COMMUNICATION CH (33CH) |
| 300 | PUBLIC CONTROL CH | PUBLIC CONTROL CH | PUBLIC CONTROL CH |
| 301 | PRIVATE CONTROL CH | PRIVATE CONTROL CH | PRIVATE CONTROL CH |
| 302 | SPEECH COMMUNICATION CH (61CH) | SPEECH COMMUNICATION CH (62CH) | SPEECH COMMUNICATION CH (63CH) |
| 300 | PUBLIC CONTROL CH | PUBLIC CONTROL CH | PUBLIC CONTROL CH |
| 301 | PRIVATE CONTROL CH | PRIVATE CONTROL CH | PRIVATE CONTROL CH |
| 303 | SPEECH COMMUNICATION CH (02CH) | SPEECH COMMUNICATION CH (03CH) | SPEECH COMMUNICATION CH (04CH) |
| 300 | PUBLIC CONTROL CH | PUBLIC CONTROL CH | PUBLIC CONTROL CH |
| 301 | PRIVATE CONTROL CH | PRIVATE CONTROL CH | PRIVATE CONTROL CH |
| 302 | SPEECH COMMUNICATION CH (01CH) | SPEECH COMMUNICATION CH (02CH) | SPEECH COMMUNICATION CH (03CH) |
| 300 | PUBLIC CONTROL CH | PUBLIC CONTROL CH | PUBLIC CONTROL CH |
| 301 | PRIVATE CONTROL CH | PRIVATE CONTROL CH | PRIVATE CONTROL CH |
| 302 | SPEECH COMMUNICATION CH (31CH) | SPEECH COMMUNICATION CH (32CH) | SPEECH COMMUNICATION CH (33CH) |
| 300 | PUBLIC CONTROL CH | PUBLIC CONTROL CH | PUBLIC CONTROL CH |
| 301 | PRIVATE CONTROL CH | PRIVATE CONTROL CH | PRIVATE CONTROL CH |
| 302 | SPEECH COMMUNICATION CH (61CH) | SPEECH COMMUNICATION CH (62CH) | SPEECH COMMUNICATION CH (63CH) |
| 300 | PUBLIC CONTROL CH | PUBLIC CONTROL CH | PUBLIC CONTROL CH |
| 301 | PRIVATE CONTROL CH | PRIVATE CONTROL CH | PRIVATE CONTROL CH |
| 303 | SPEECH COMMUNICATION CH (03CH) | SPEECH COMMUNICATION CH (04CH) | SPEECH COMMUNICATION CH (05CH) |
| 300 | PUBLIC CONTROL CH | PUBLIC CONTROL CH | PUBLIC CONTROL CH |
| 301 | PRIVATE CONTROL CH | PRIVATE CONTROL CH | PRIVATE CONTROL CH |
| 302 | SPEECH COMMUNICATION CH (01CH) | SPEECH COMMUNICATION CH (02CH) | SPEECH COMMUNICATION CH (03CH) |
| 300 | PUBLIC CONTROL CH | PUBLIC CONTROL CH | PUBLIC CONTROL CH |
| 301 | PRIVATE CONTROL CH | PRIVATE CONTROL CH | PRIVATE CONTROL CH |

PRIVATE IDENTIFICATION CODE FORMAT

FIG. 13

PUBLIC IDENTIFICATION CODE FORMAT

RADIO COMMUNICATION SYSTEM WITH ENHANCED CONNECTION PROCESSING

BACKGROUND OF THE INVENTION

1. Field of the Invention

The present invention relates to a radio communication system which realizes intercommunications between radio terminals.

2. Description of the Related Art

Conventionally, in a normal communication system adopting a simplex method which is known as the method of making radio connections without using a specific channel for transmitting control signals, a calling party detects an idle channel and transmits connection request information for a prescribed period of time. A radio terminal which is in a standby state scans all the channels to receive the connection request information.

However, in the simplex method, there is a high probability for the radio terminal to scan all the channels before it receives a calling signal, and a considerably long time is required until connection is achieved.

SUMMARY OF THE INVENTION

It is an object of the present invention to provide a radio communication system which can shorten the connection processing time required for connecting radio terminals to each other.

It is another object of the present invention to provide a radio communication system which allows an interworking among a plurality of radio communication networks with a simple operation.

It is still another object of the present invention to provide a radio communication system which allows an interworking among a plurality of radio communication networks with a simple structure.

In order to achieve the above objects, according to a preferred aspect of the present invention, there is disclosed a radio communication system, which comprises a radio base station which accommodates a plurality of radio communication terminals in a radio communication area, and a plurality of radio communication terminals each of which performs a communication using a control channel and a communication channel when the communication is performed via said radio base station, comprising: communication means for performing a communication with another radio communication terminal using the communication channel without using the control channel; setting means for setting at least one specific communication channel from a plurality of communication channels; confirmation means for preferentially confirming an idle state of the specific communication channel among all the communication channels; and connection means for connecting a radio line with a destination radio communication terminal in accordance with a result obtained by said confirmation means.

There is also disclosed a communication method for a radio communication system, which comprises a radio base station which accommodates a plurality of radio communication terminals in a radio communication area, and a plurality of radio communication terminals each of which performs a communication using a control channel and a communication channel when the communication is performed via said radio base station, comprising the steps of: setting at least one specific communication channel from a plurality of communication channels when a communication is performed with another radio communication terminal using the communication channel without using the control channel; preferentially confirming an idle state of the specific communication channel among all the communication channels; and connecting a radio line with a destination radio communication terminal in accordance with a result obtained in the confirmation step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 shows the channel scan pattern of the radio terminal of the first embodiment;

DESCRIPTION OF THE PREFERRED EMBODIMENTS (First Embodiment)

The preferred embodiment of the present invention will be described in detail hereinafter with reference to the accompanying drawings.

Figure 1:
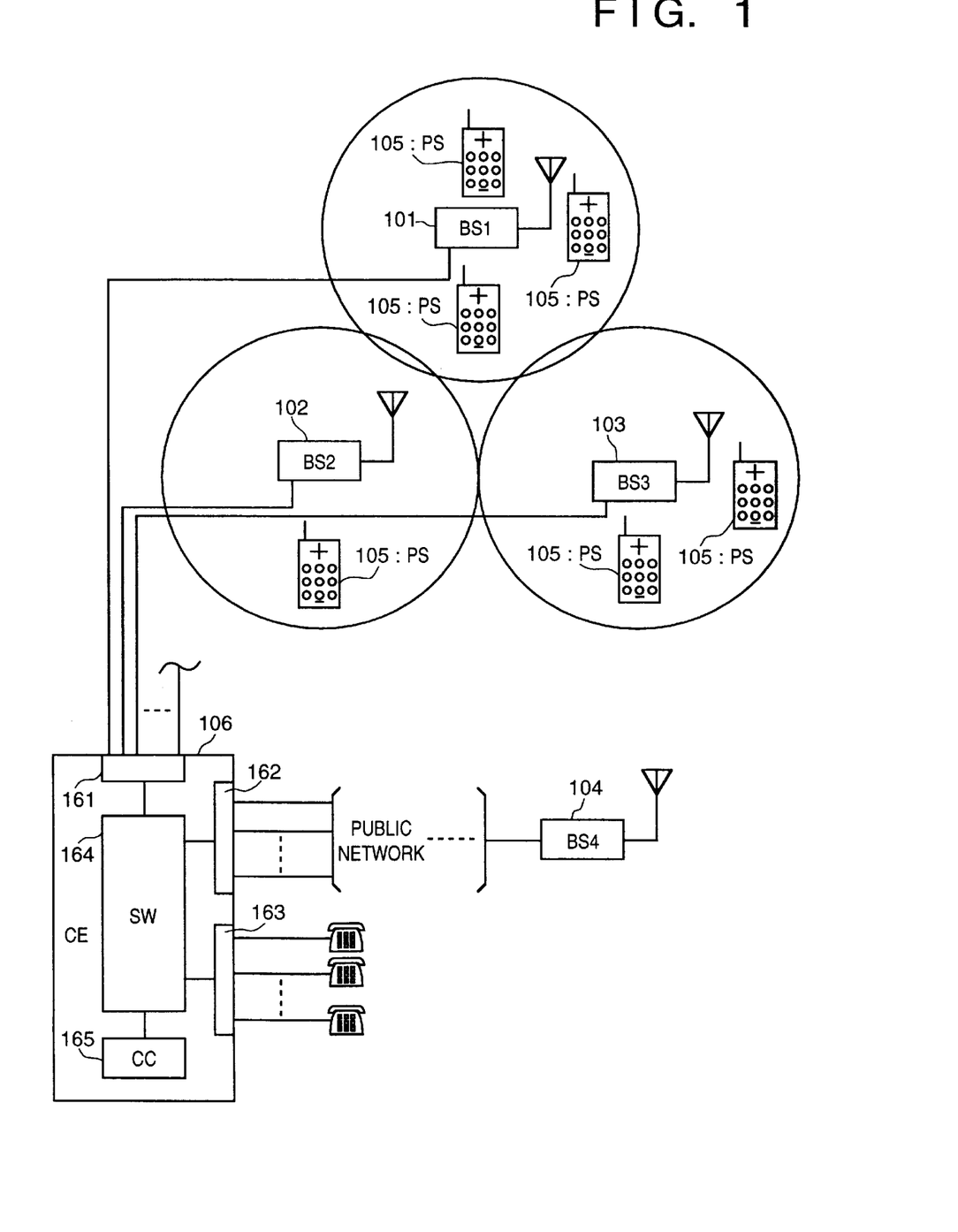
FIG. 1 is a block diagram of a digital cordless telephone system according to the first embodiment of the present invention.

FIG. 1 is a block diagram showing the system arrangement of a digital cordless telephone system according to the first embodiment of the present invention.

Referring to FIG. 1, reference numerals 101 to 104 denote radio base stations (BS1 to BS4); 105, a radio terminal personal station (PS); and 106, a communication controller (CE).

The communication controller CE comprises interfaces 161, 162, and 163 for accommodating the radio base stations BS1 to BS4, a public network, and telephone sets, an exchange switch (SW) 164, and a central control unit (CC) 165. The CC 165 has an internal memory for storing control programs, various setting data, and the like.

Figure 2:
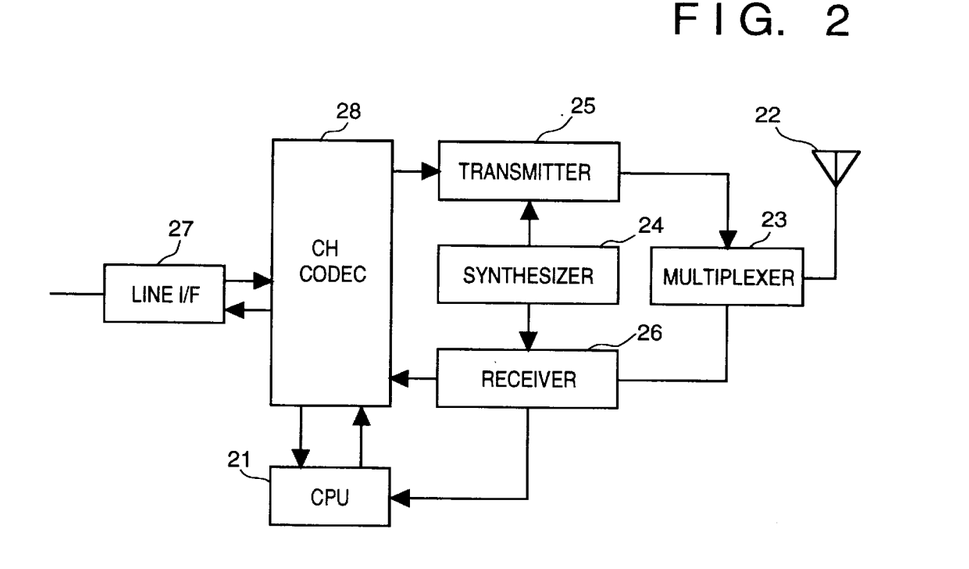
FIG. 2 is a block diagram showing the internal arrangement of a radio base station of the first embodiment.

FIG. 2 is a block diagram showing the arrangement of the radio base station BS in this embodiment.

The radio base station BS comprises a CPU 21 having an internal memory for storing control programs, various setting data, and the like, an antenna 22, a transmission/reception multiplexer 23, a synthesizer 24, a transmitter 25, a receiver 26, a line interface 27, and a channel codec 28.

The CPU 21 controls the radio base station BS. The antenna 22 transmits/receives radio waves.

The multiplexer 23 selects one of the transmitter 25 and the receiver 26. The synthesizer 24 performs frequency selection.

The transmitter 25 performs down conversion, demodulation, and the like. The receiver 26 performs QPSK encoding, quadrature modulation, up conversion, power amplification, and the like. The line interface 27 performs communications with the communication controller CE. The codec 28 includes an ADPCM codec and the like. The CPU 21 receives a received electric field strength signal from the receiver 26.

Figure 3:
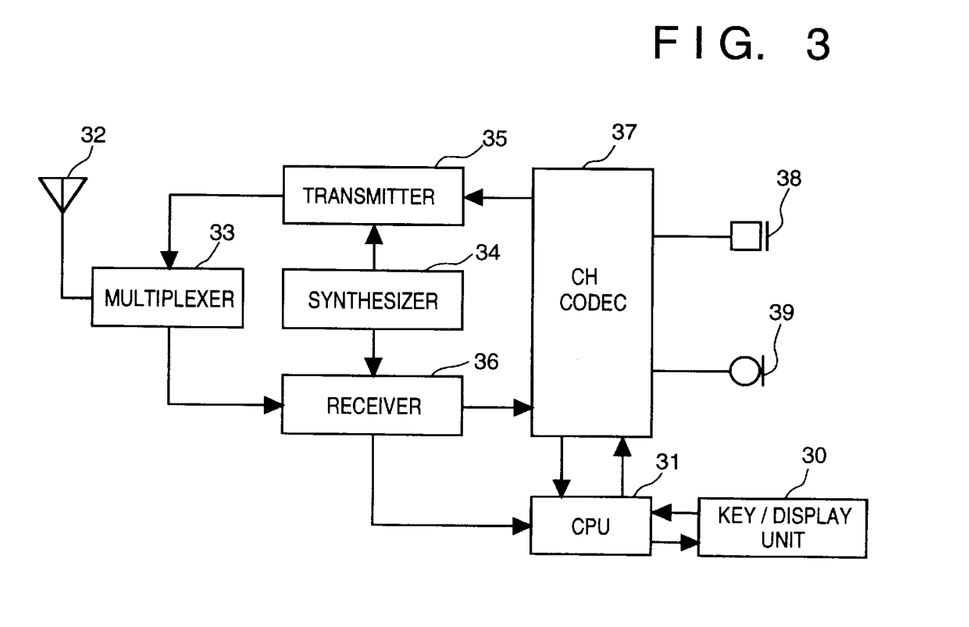
FIG. 3 is a block diagram showing the internal arrangement of a radio terminal of the first embodiment.

FIG. 3 is a block diagram showing the arrangement of the radio terminal PS in this embodiment.

The radio terminal PS comprises a CPU 31 having an internal memory for storing control programs, various setting data, and the like, an antenna 32, a transmission/reception multiplexer 33, a synthesizer 34, a transmitter 35, a receiver 36, a channel codec 37, a microphone 38, a loudspeaker 39, and a key/display unit 30.

The CPU 31 controls the radio terminal PS. The antenna 32 transmits/receives radio waves. The multiplexer 33 selects one of the transmitter 35 and the receiver 36. The synthesizer 34 performs frequency selection.

The transmitter 35 performs down conversion, demodulation, and the like. The receiver 36 performs QPSK encoding, quadrature modulation, up conversion, power amplification, and the like. The codec 37 includes an ADPCM codec and the like. The CPU 31 receives a received electric field strength signal from the receiver 36.

Figure 4:
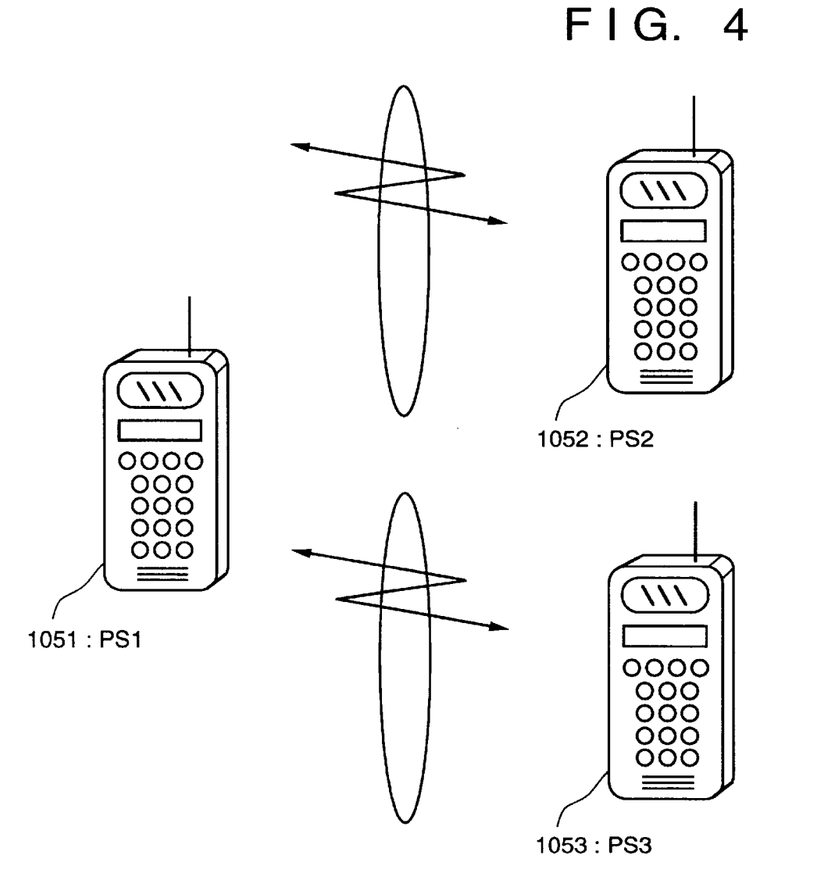
FIG. 4 is a schematic view showing the principle of connections among radio terminals of the first embodiment.

FIG. 4 shows the principle of connections among the terminals 105 (PS) in the digital cordless telephone system according to the first embodiment of the present invention. In FIG. 4, reference numerals 1051 to 1053 denote radio terminals (PS1 to PS3) for the digital cordless telephone system. When these radio terminals 105 (PS) are present in a single radio service area, they can communicate with each other, without relying upon the radio base station, upon establishment of a radio line between them.

In radio intercommunications between these radio terminals (PS), since no specific control signal transmission channel is assigned, a calling party detects an idle channel and transmits connection request information for a prescribed period of time. A radio terminal (PS) which is in a standby state scans channels to receive the connection request information, thus starting a communication.

Figure 5:
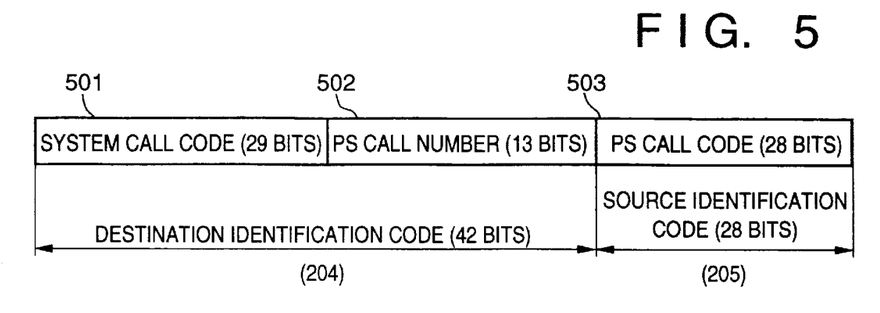
FIG. 5 shows the format of identification codes used for connecting radio terminals.

FIG. 5 shows the format of identification codes used for connecting radio terminals (PS) in the digital cordless telephone system of this embodiment. Referring to FIG. 5, a system call code 501 is a 29-bit call code assigned to each system when a radio terminal (PS) is used in a private-mode-like communications in a single system. The interconnection between radio terminals (PS) can be attained when system call codes of these radio terminals match with each other.

A PS call number 502 is a logic number which is effective for only the interconnection between radio terminals (PS), and consists of 13 bits. The PS call number 502 corresponds to a terminal (PS) extension number open to a user. A PS call code 503 is a 28-bit code assigned to each terminal (PS).

Of the identification codes, different priority-monitor-target speech communication channel groups are set in units of the PS call numbers 502. In a single system, since different PS call numbers are assigned to the individual terminals, different priority-monitor-target speech communication channels are set in units of radio terminals.

The priority-monitor-target speech communication channel is a channel which is preferentially searched upon search for a channel to be used in a communication between radio terminals (PS). The priority-monitor-target speech communication channel is set by a predetermined method, e.g., by multiplying the PS call number 502 with a predetermined function, or assigning channels in units of PS call numbers.

FIG. 6 shows the channel scan patterns in units of radio terminals (PS) in this embodiment. In this embodiment, as shown in FIG. 6, the terminal PS1 uses channels "01", "31", and "61", the terminal PS2 uses channels "02", "32", and "62", and the terminal PS3 uses channels "03", "33", and "63", as priority-monitor-target speech communication channels.

In FIG. 6, Reference numeral 300 denotes a monitor period of a control channel for public-use used when a radio terminal PS which is accommodated in the radio base terminal BS1, performs a communication using the radio base station BS4 connected via the public line; 301, a monitor period of a control channel for private-use used in a communication via the base station in a single system; 302, a monitor period for the priority-monitor-target speech communication channel group; and 303, a monitor period for a speech communication channel group other than the priority-monitor-target speech communication channel group.

Scan control for realizing the scan patterns shown in FIG. 6 will be explained below.

Figure 7:
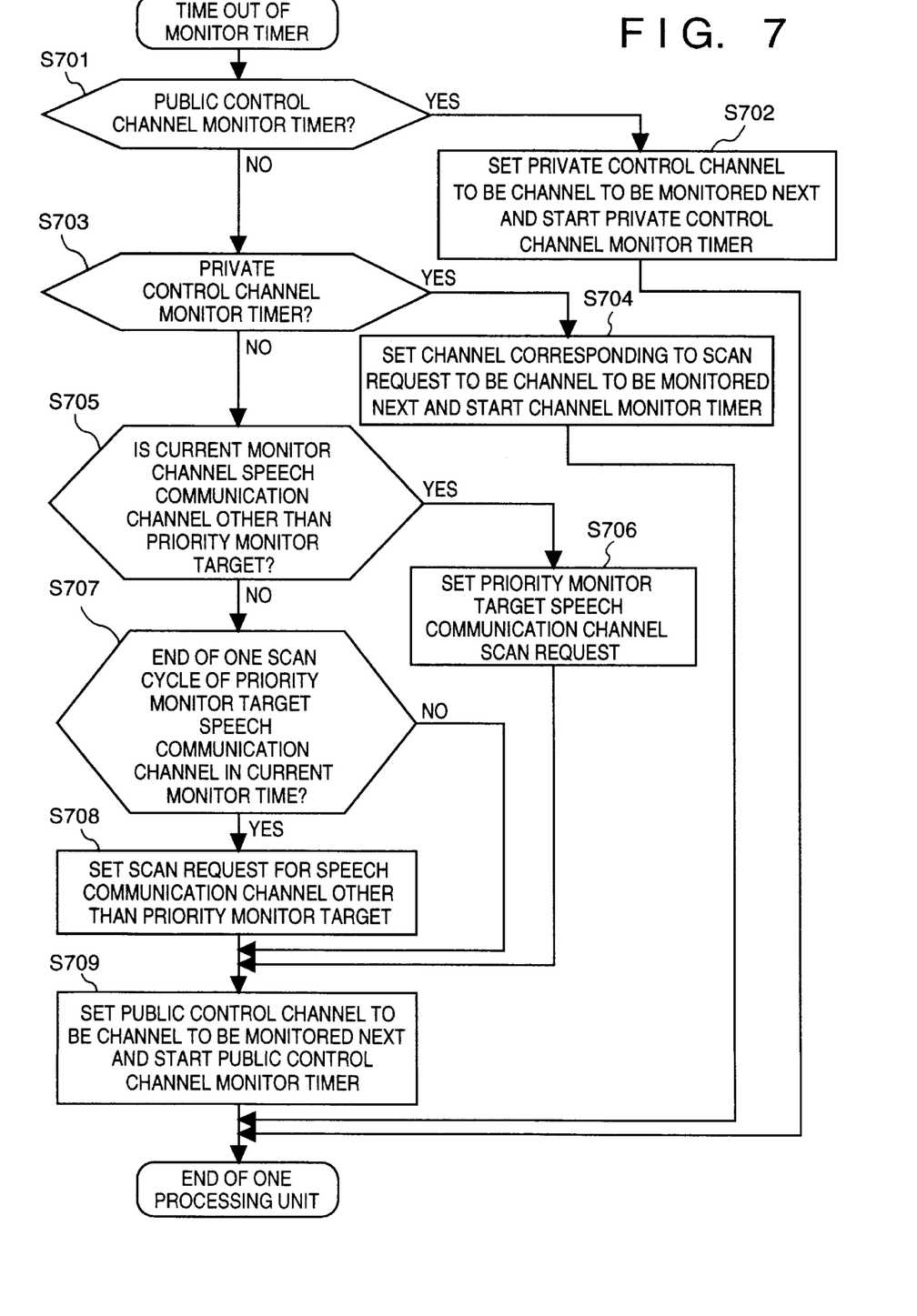
FIG. 7 is a flow chart showing the scan control sequence of the radio terminal of the first embodiment.

FIG. 7 is a flow chart showing the scan control sequence in the digital cordless telephone system according to this embodiment. In this embodiment, the type of a channel which has been monitored so far is discriminated in response to a time-out signal, which is regarded as a trigger signal, from a monitor timer (not shown) for measuring the monitor period of each channel.

In step S701 in FIG. 7, it is checked if a control channel for public-use is being monitored. If YES in step S701, a control channel for private-use is set to be the channel to be monitored next, and a timer for measuring monitor time of the control channel for private-use is started (step S702).

However, if NO in step S701, and if it is determined in step S703 that the control channel for private-use is being monitored, a speech communication channel corresponding to a scan request condition is set to be the channel to be monitored next, and a timer for measuring the speech channel monitor time is started (step S704).

On the other hand, if the monitor channel is neither the control channel for public-use nor the control channel for private-use, it is determined that a speech communication channel is being monitored, and it is checked in step S705 if the monitor channel is the speech communication channel other than the priority-monitor-target speech communication channels. If YES in step S705, a request forgetting the priority-monitor-target speech communication channel to be the speech communication channel which will be monitored next time, is set in step S706.

However, if NO in step S705, it is checked if the priority-monitor-target speech communication channels have been monitored for one scan cycle during the current monitoring (step S707). If YES in step S707, a request for setting a speech communication channel other than the priority-monitor-target speech communication channels to be the speech communication channel which will be monitored next time, is set in step S708.

Note that one scan cycle means a period until all the priority-monitor-target speech communication channels are monitored once.

Take the radio terminal PS1 in FIG. 6 for example. One scan cycle ends when all the channels "01", "31", and "61" as the priority-monitor-target speech communication channels are monitored, and speech communication channels other than the priority-monitor-target speech communication channels are monitored as the speech communication channels to be monitored next. In this manner, after the control channel for public-use and the control channel for private-use are monitored, one speech communication channel is monitored. In this case, the priority-monitor-target speech communication channels are preferentially monitored, and after all the priority-monitor-target speech communication channels are monitored, a speech communication channel other than the priority-monitor-target speech communication channels is monitored.

On the other hand, if it is determined that one scan cycle has not ended, the above-mentioned request is not set to continuously monitor the priority-monitor-target speech communication channel at the next cycle.

After the end of speech communication channel monitor discrimination (steps S705 to S708), the control channel for public-use is set to be the channel to be monitored next, and a timer for measuring the monitor time for the control channel for public-use is started in step S709.

Figure 8:
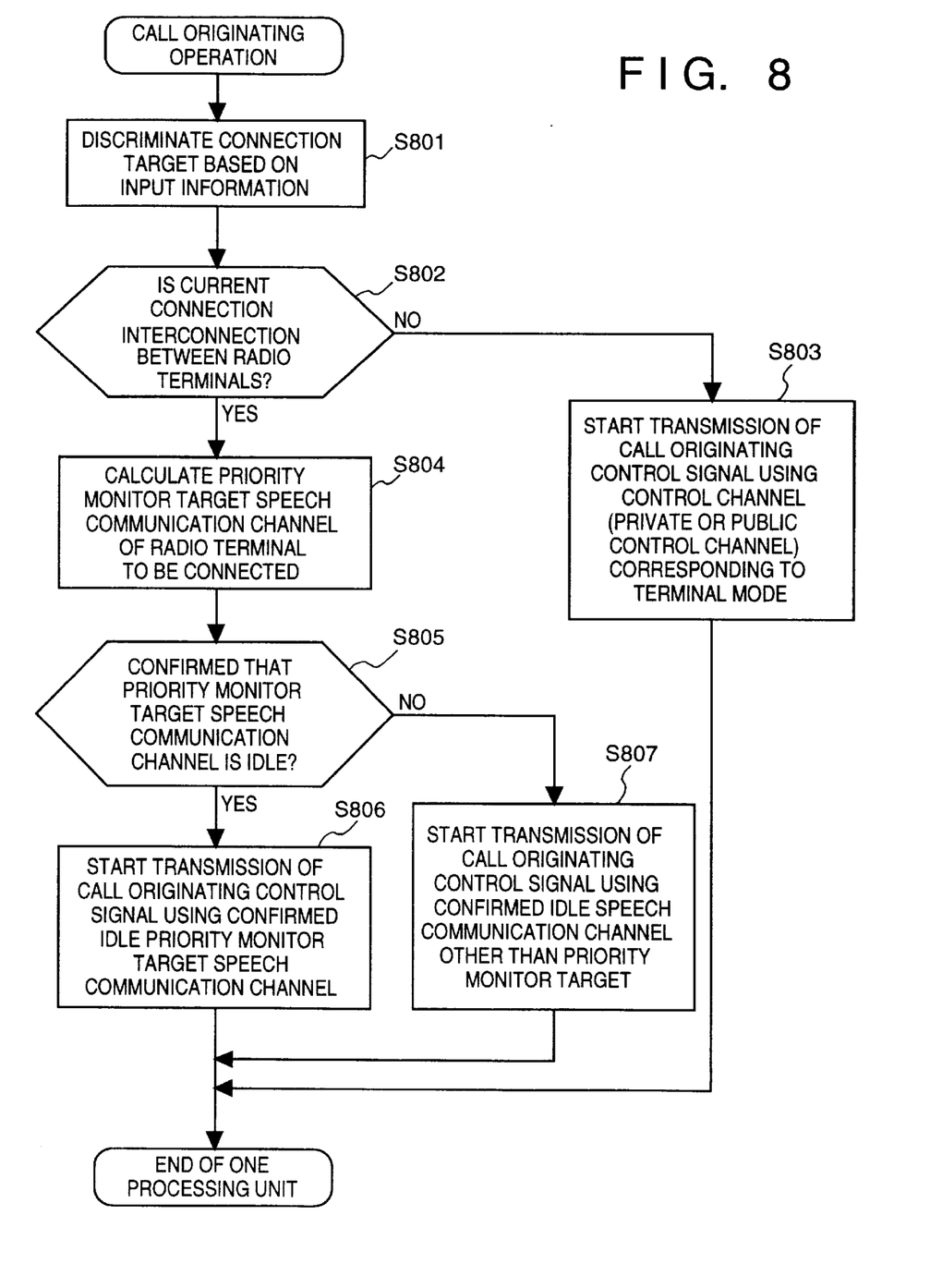
FIG. 8 is a flow chart showing the processing sequence for determining a use channel upon a call originating operation in the radio terminal of the first embodiment.

FIG. 8 is a flow chart showing the processing sequence for determining a channel which can be used, upon a call originating operation of a radio terminal (PS) for the digital cordless telephone system of this embodiment.

Referring to FIG. 8, a destination or callee to be connected is discriminated based on input information in step S801. It is checked in step S802 if the destination to be connected (current connection) is a radio terminal, that is, an interconnection between the radio terminals. If NO in step S802, a call originating control signal is transmitted using a control channel (for private-use or for public-use) corresponding to the terminal mode (step S803).

On the other hand, if YES in step S802, priority-monitor-target speech communication channels are determined, on the basis of the setting method used upon setting the priority-monitor-target speech communication channels at the destination terminal, using the PS call number 502 of the destination terminal shown in FIG. 5 (step S804). In step S805, it is confirmed if the priority-monitor-target speech communication channels include an idle channel.

If YES in step S805, a call originating control signal is transmitted in step S806, using the priority-monitor-target speech communication channel which has been confirmed to be idle in step S805. However, if NO in step S805, a calling signal is transmitted using an idle speech communication channel other than the priority-monitor-target speech communication channels in step S807.

If a priority-monitor-target speech communication channel is not confirmed to be an idle more than a predetermined number of times in step S805, the channel is excluded from the priority-monitor-target speech communication channels, and is set to be a speech communication channel other than the priority-monitor-target speech communication channels from the next scan cycle, thereby further shortening the connection processing time when interconnection is executed between radio terminals.

As described above, according to this embodiment, when radio terminals (PS) for the digital cordless telephone system are to achieve an interconnection between the terminals (interconnection between terminals PS), the calling terminal transmits a calling signal by preferentially using a priority-monitor-target speech communication channel which is frequently monitored by a destination terminal, thereby shortening the connection processing time required for interconnecting the radio terminals.

In this embodiment, the digital cordless telephone system has been exemplified as a radio communication system. However, the present invention is not limited to this, but may be applied to interconnections between terminals in a digital cellular (digital automobile telephone) system and a digital cordless telephone system such as DECT (Digital European Cordless Telephone), PCS (Personal Communication System) and the like, which adopt a TDD (Time Division Duplex) method, a TDMA (Time Division Multiple Access) method.

(Second Embodiment)

The second embodiment of the present invention will be described below.

Figure 9:
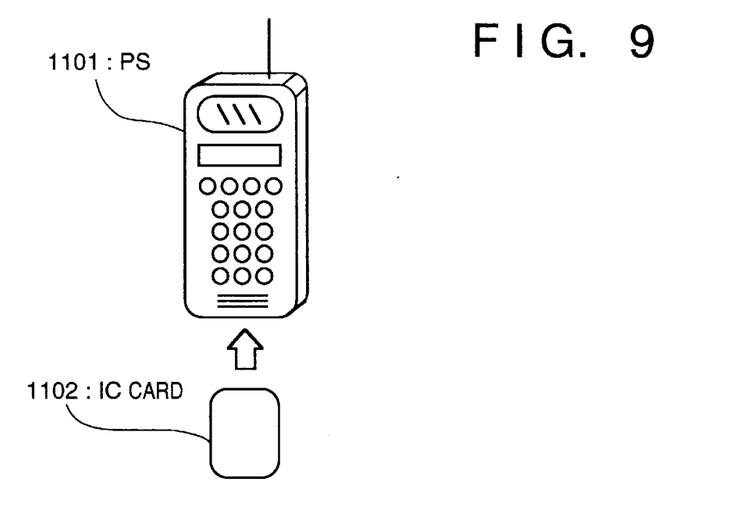
FIG. 9 is a block diagram showing a digital cordless telephone system according to the second embodiment of the present invention.

FIG. 9 is a block diagram showing the arrangement of a digital cordless telephone terminal according to the second embodiment of the present invention.

Referring to FIG. 9, reference numeral 1101 denotes a digital cordless telephone terminal (PS); and 1102, an IC card which is inserted in the digital cordless telephone terminal (PS) 1101, stores a radio identification code, and does not require any back-up battery.

Figure 10:
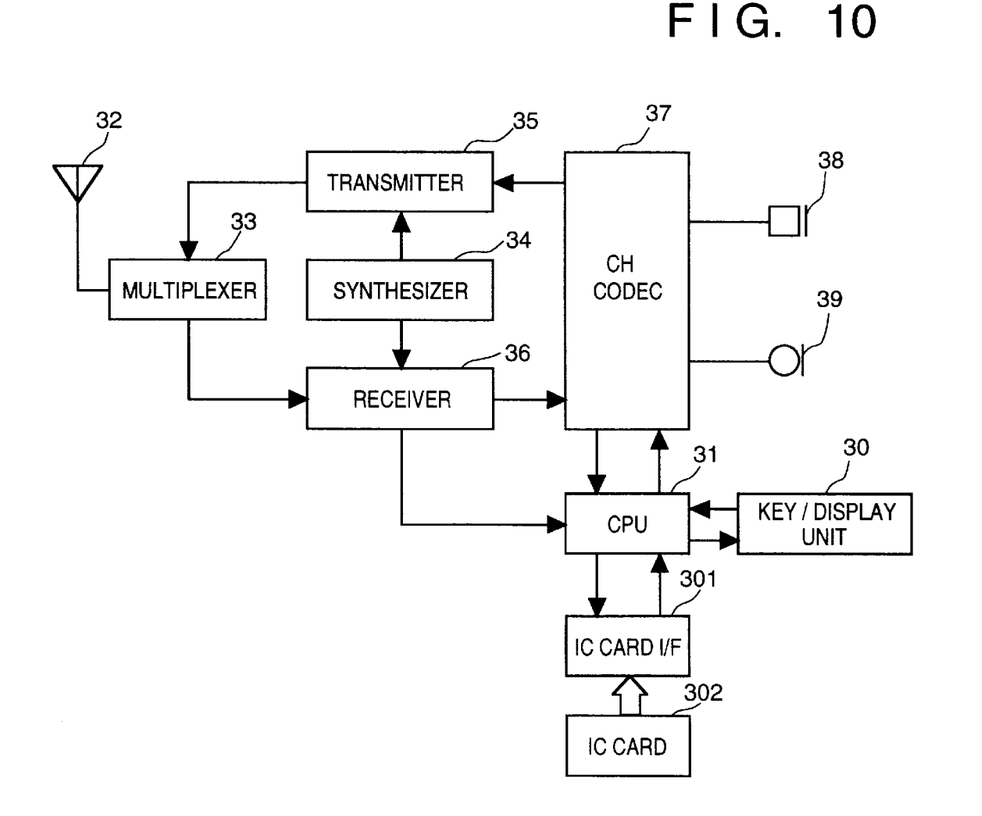
FIG. 10 is a block diagram showing the internal arrangement of a radio terminal of the second embodiment.

FIG. 10 is a block diagram showing the internal arrangement of the digital cordless telephone terminal.

Referring to FIG. 10, reference numeral 301 denotes an IC card interface, which is used for the externally inserted IC card. Reference numeral 302 denotes an IC card which stores a radio identification code. Other portions of the digital cordless telephone terminal shown in FIG. 10 are the same as those in the first embodiment, and a detailed description thereof will be omitted.

In the second embodiment, the above-mentioned digital cordless telephone terminal is used in the system which is described as the first embodiment.

The IC card to be inserted in the digital cordless telephone terminal stores a PS call number which is different in units of IC cards.

In the digital cordless telephone terminal shown in FIGS. 9 and 10, when a connection using a priority-monitor-target speech communication channel cannot be successfully achieved for some unknown reason such as radio disturbance, or when an idle priority-monitor-target speech communication channel cannot be confirmed, information indicating this status is given to a user using a display unit 30 or a loudspeaker 39. Upon reception of this information, the user exchanges the IC card with another one. Thus, the PS call number of the digital cordless telephone terminal changes, and the priority-monitor-target speech communication channels are also changed.

With this arrangement, radio channels can be used more efficiently.

(Third Embodiment)

The third embodiment of the present invention will be described below.

In the third embodiment, another application of the digital cordless telephone terminal of the second embodiment will be explained.

Figure 11:
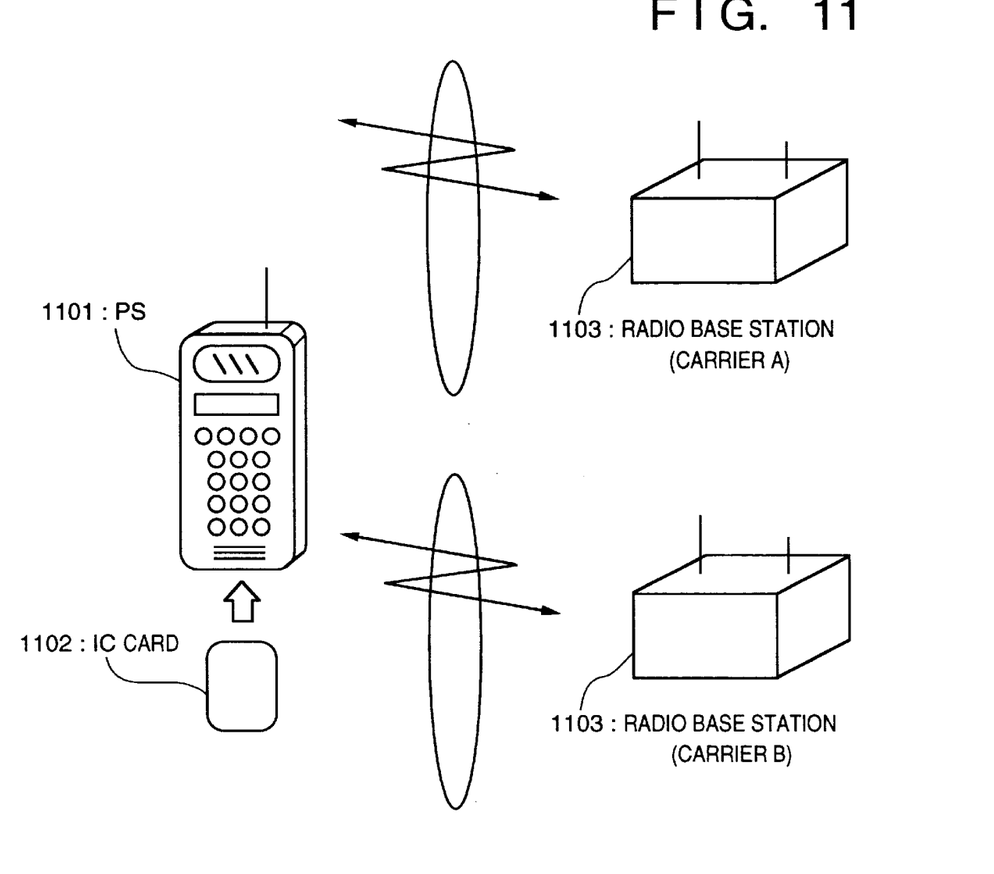
FIG. 11 is a block diagram showing a digital cordless telephone system according to the third embodiment of the present invention.

FIG. 11 is a block diagram showing the system arrangement of a digital cordless telephone system according to the third embodiment of the present invention.

Referring to FIG. 11, reference numeral 1101 denotes a digital cordless telephone terminal (PS); and 1102, an IC card which is inserted in the digital cordless telephone terminal (PS) 1101, stores a radio identification code, and does not require any back-up battery. Reference numerals 1103 and 1104 denote digital cordless telephone radio base stations. The digital cordless telephone radio base station 1103 is provided by a common carrier A, and the digital cordless telephone radio base station 1104 is provided by a common carrier B.

Since the arrangement of the digital cordless telephone terminal shown in FIG. 11 is the same as that in the second embodiment, and the arrangement of each of the radio base stations 1103 and 1104 is the same as that in the first embodiment, a detailed description thereof will be omitted.

Figure 12:
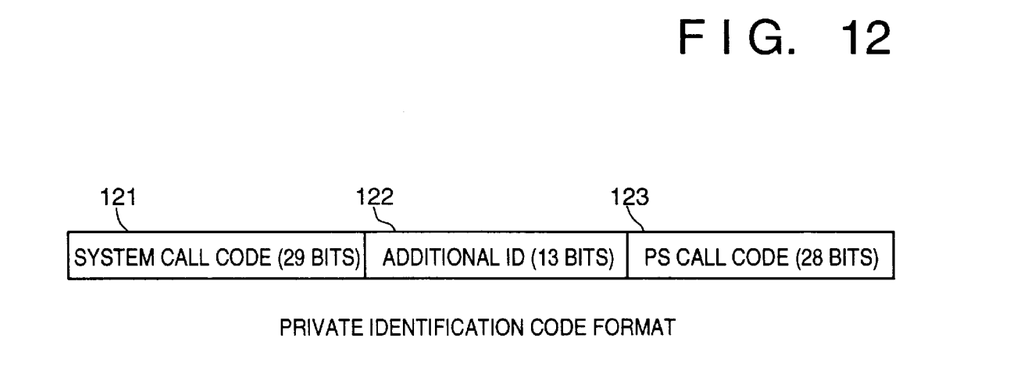
FIG. 12 shows the format of identification codes for private-use for a radio terminal of the third embodiment.
Figure 13:
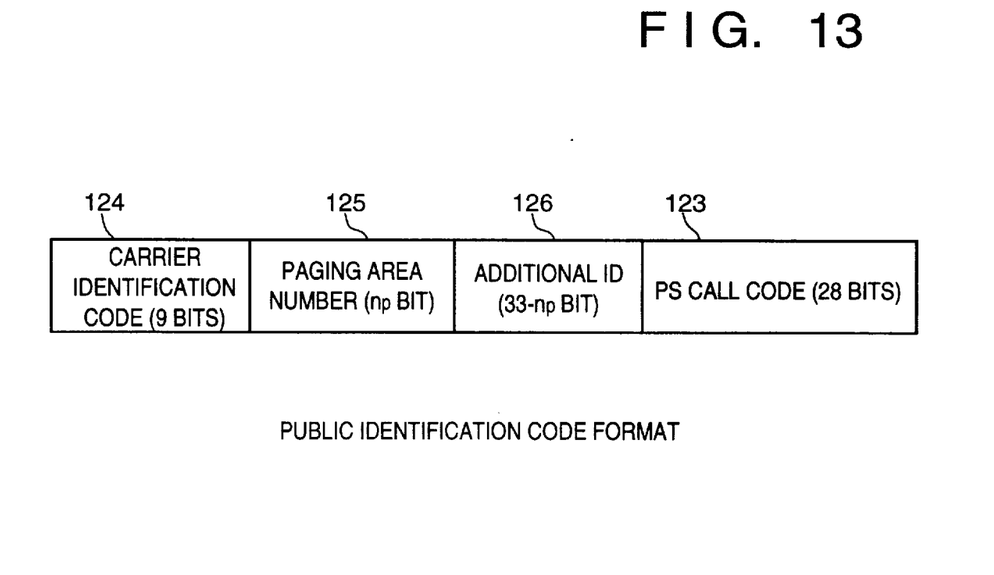
FIG. 13 shows the format of identification codes for public-use for the radio terminal of the third embodiment.

FIGS. 12 and 13 show the formats of the identification codes for the terminal (PS) in the digital cordless telephone system of this embodiment. More specifically, FIG. 12 shows the format of an identification code for private-use, which includes a system call code 121, an additional ID 122, and a PS call code 123.

FIG. 13 shows the format of an identification code for public-use, which includes a carrier identification code 124, a paging area number 125, an additional ID 126, and a PS call code 123.

The digital cordless telephone radio base stations shown FIG. 11 use a single radio medium, but are provided by different common carriers. For this reason, these carriers have different values of the carrier identification code 124 shown in FIG. 13. In order to permit a radio connection between the digital cordless telephone radio base station 1103 (common carrier A) and the digital cordless telephone radio base station 1104 (common carrier B), the carrier identification code 124 must be switched as needed.

The setting operation of the radio identification code in the digital cordless telephone terminal (PS) in the digital cordless telephone system of this embodiment will be explained below.

Figure 14:
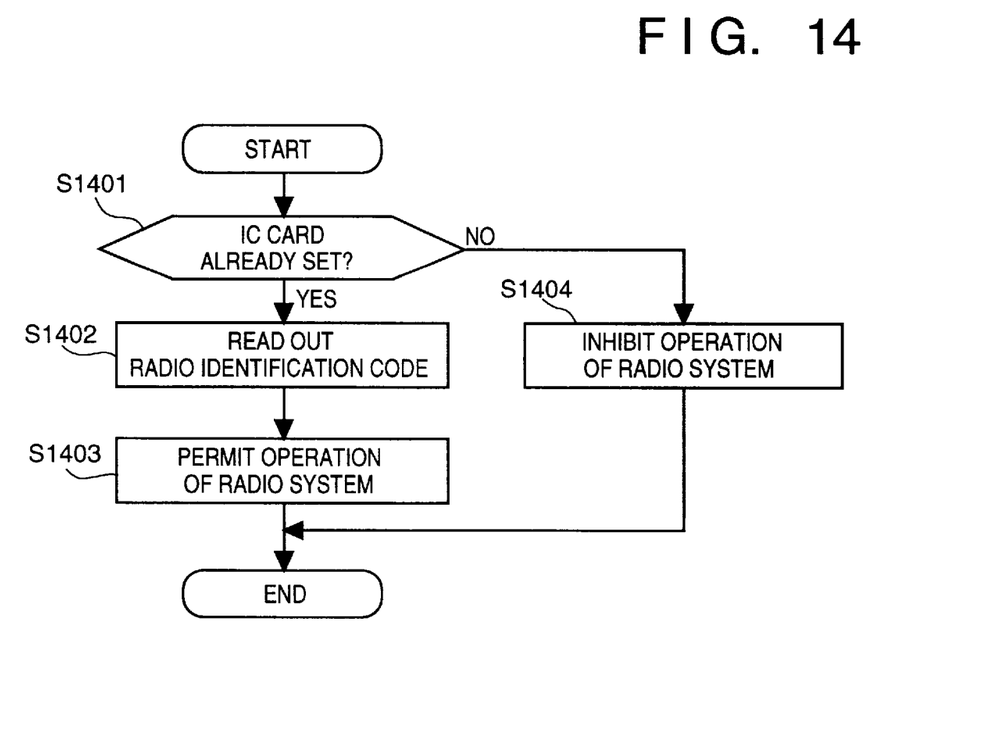
FIG. 14 is a flow chart showing the sequence for setting radio identification codes for the radio terminal of the third embodiment.

FIG. 14 is a flow chart showing the sequence for setting a radio identification code in the digital cordless telephone terminal (PS) in the digital cordless telephone system of this embodiment. In step S1401 in FIG. 14, it is checked if the IC card 1102 is set in the digital cordless telephone terminal (PS). If NO in step S1401, the operation associated with radio system processing is inhibited (step S1404).

However, if YES in step S1401, the radio identification code is read out from the IC card in step S1402, and the operation associated with the radio system is permitted in step S1403.

As described above, according to this embodiment, by exchanging an IC card which is set in the radio terminal and stores a radio identification code, various radio identification codes corresponding to a plurality of radio communication networks with different carrier identification codes can be switched. Therefore, a cumbersome procedure for storing a radio identification code in an internal storage medium of the terminal can be eliminated, and the radio terminal and the medium which stores radio identification information can be independently managed. Furthermore, roaming between a plurality of radio communication networks can be realized.

In addition, an end user need not store radio identification codes, and radio identification codes can be assigned in units of users.

In the second and third embodiments, the digital cordless telephone system has been exemplified as a radio communication system. However, the present invention is not limited to this, but may be applied to interconnections between terminals in a digital cellular (digital automobile telephone) system and a digital cordless telephone system such as DECT (Digital European Cordless Telephone), PCS (Personal Communication System) and the like, which adopt a TDD (Time Division Duplex) method, a TDMA (Time Division Multiple Access) method.

Furthermore, in the second and third embodiments, the IC card is used as a nonvolatile storage medium. Alternatively, other nonvolatile storage media such as a magnetooptical card, a magnetic card, and the like may be used.

The present invention may be applied to a system constituted by a plurality of apparatuses or an apparatus constituted by a single device. The present invention can also be applied to a case wherein the invention is achieved by supplying a program stored in a storage medium to the system or the apparatus.

As many apparently widely different embodiments of the present invention can be made without departing from the spirit and scope thereof, it is to be understood that the invention is not limited to the specific embodiments thereof except as defined in the appended claims.

What is claimed is:

1. A radio communication system having a radio base station which accommodates a plurality of radio communication apparatuses in a radio communication area, and a plurality of radio communication apparatuses each of which is capable of performing first communication using a communication channel determined by using a control channel and second communication using a communication channel determined without using said control channel, wherein each of said plurality of radio communication apparatuses comprising:

determination means for determining at least one specific communication channel to perform said second communication; and confirmation means for confirming states of a plurality of communication channels in such a manner that a number of times of confirming operation to confirm the specific communication channel, determined by said determination means, is greater than that of the other communication channels, for a predetermined time period.

2. The system according to claim 1, wherein said confirmation means confirms the idle state of the specific communication channel in terms of a destination radio communication apparatus.

3. The system according to claim 1, wherein said determination means determines the specific communication channel in units of the radio communication apparatus.

4. The system according to claim 3, wherein said determination means determines the specific communication channel based on an identification code assigned to each of the radio communication apparatus.

5. The system according to claim 1, wherein when it is confirmed over a predetermined number of times that the specific communication channel is not idle, said confirmation means excludes the specific communication channel from a target to be confirmed.

6. The system according to claim 1, wherein said radio communication system performs a communication by a TDD (Time Division Duplex) method or a TDMA (Time Division Multiple Access)-TDD method.

7. The system according to claim 1, wherein said first communication is a communication via the radio base station.

8. The system according to claim 1, wherein said second communication is a communication realized by directly connecting one radio communication apparatus with another radio communication apparatus, not via the radio base station.

9. A radio communication apparatus comprising:

communication means for performing first communication with another communication apparatus by using a communication channel determined by using a control channel, and second communication with another communication apparatus by using a communication channel determined without using the control channel;

determination means for determining at least one specific communication channel from among a plurality of communication channels to perform said second communication; and confirmation means for confirming states of the plurality of communication channels in such a manner that a number of times of confirming operation to confirm the specific communication channel, determined by said determination means, is greater than that of the other communication channels, for a predetermined time period.

10. The apparatus according to claim 9, wherein said communication means confirms the idle state of the specific communication channel in terms of a destination radio communication apparatus.

11. The apparatus according to claim 9, wherein said determination means determines the specific communication channel in units of the radio communication apparatuses.

12. The apparatus according to claim 11, wherein said determination means determines the specific communication channel based on an identification code assigned to each of the radio communication apparatuses.

13. The apparatus according to claim 9, wherein when it is confirmed over a predetermined number of times that the specific communication channel is not idle, said confirmation means excludes the specific communication channel from a target to be confirmed.

14. The apparatus according to claim 9, wherein said radio communication apparatus performs a communication by a TDD (Time Division Duplex) method or a TDMA (Time Division Multiple Access)-TDD method.

15. The apparatus according to claim 9, wherein said first communication is a communication via the radio base station which accommodates a radio communication apparatus.

16. The apparatus according to claim 9, wherein said second communication is a communication realized by directly contacting one radio communication apparatus with another radio communication apparatus, not via the radio base station.

17. A control method of a radio communication system having a radio base station which accommodates a plurality of radio communication apparatuses in a radio communication area, and a plurality of radio communication apparatuses each of which is capable of performing first communication using a communication channel determined by using a control channel and second communication using a communication channel determined without using said control channel, wherein said control method comprising the steps of:

determining at least one specific communication channel to perform said second communication; and confirming states of a plurality of communication channels in such a manner that a number of times of confirming operation to confirm the specific communication channel, determined by said determination means, is greater than that of the other communication channels, for a predetermined time period.

18. The method according to claim 17, wherein the confirmation step includes the step of confirming the idle state of the specific communication channel in terms of the destination radio communication apparatus.

19. The method according to claim 17, wherein the determination step includes the step of determining the specific communication channel based on an identification code assigned to each of the radio communication apparatus.

20. The method according to claim 17, wherein the determination step includes the step of determining the specific communication channel based on an identification code assigned to each of the radio communication apparatus.

21. The method according to claim 17, wherein the confirmation step includes the step of excluding the specific communication channel from a target to be confirmed, when it is confirmed over a predetermined number of times that the specific communication channel is not idle.

22. The method according to claim 17, wherein said first communication is a first communication via the radio base station.

23. The method according to claim 17, wherein said second communication is a communication realized by directly connecting one radio communication apparatus with another radio communication apparatus, not via the radio base station.

24. A radio communication method of a radio communication apparatus which is capable of performing first communication with another communication apparatus by using a communication channel determined by using a control channel, and second communication with another communication apparatus by using a communication channel determined without using the control channel, comprising the steps of:

determining at least one specific communication channel from among a plurality of communication channels to perform said second communication; and confirming states of the plurality of communication channels in such a manner that a number of times of confirming operation to confirm the specific communication channel, determined by said determination means, is greater than that of the other communication channels, for a predetermined time period.

25. The method according to claim 24, wherein the confirmation step includes the step of confirming the idle state of the specific communication channel in terms of the destination radio communication apparatus.

26. The method according to claim 24, wherein the determining step includes the step of determining the specific communication channel in units of the radio communication apparatuses.

27. The method according to claim 26, wherein the determination step includes the step of determining the specific communication channel based on an identification code assigned to each of the radio communication apparatuses.

28. The method according to claim 24, wherein the confirmation step includes the step of excluding the specific communication channel from a target to be confirmed when it is confirmed over a predetermined number of times that the specific communication channel is not idle.

29. The method according to claim 24, wherein said first communication is a communication via the radio base station.

30. The method according to claim 24, wherein said second communication is a communication realized by directly connecting one radio communication apparatus with another radio communication apparatus, not via the radio base station.

31. A radio communication apparatus, having identifying information for discriminating the radio communication apparatus, which is capable of performing first communication with another radio communication apparatus by using a communication channel determined by using a control channel, and second communication with the other radio communication apparatus by using a communication channel determined by without using said control channel, said radio communication apparatus comprising:

determination means for determining a specific communication channel for said second communication based on the identifying information for the radio communication apparatus; and confirming means for confirming the specific communication channel, determined by said determination means, preferentially to the other communication channels.

32. The apparatus according to claim 31, wherein said determination means determines the specific communication channel based on identifying information assigned to the other communication apparatus.

33. The apparatus according to claim 31, wherein said confirmation means confirms an idle state of a communication channel.

34. The apparatus according to claim 33, wherein said confirmation means excludes the specific communication channel from the confirming operation if said confirmation means cannot confirm idle state of the specific communication channel for a predetermined number of times.

35. The apparatus according to claim 31, wherein said apparatus performs communication by a TDD (Time Division Duplex) or TDMA (Time Division Multiple Access) method.

36. A control method of a radio communication apparatus, having identifying information for discriminating the radio communication apparatus, which is capable of performing first communication with another radio communication apparatus by using a communication channel determined by using a control channel, and second communication with the other communication apparatus by using a communication channel determined without using said control channel, said control channel method comprising the steps of:

determining a specific communication channel for said second communication based on the identification information for discriminating the radio communication apparatus; and preferentially conforming the specific communication channel, determined in said determining step, to the other communication channels.

37. The method according to claim 36, wherein said determination means determines the specific communication channel based on identifying information assigned to the other communication apparatus.

38. The method according to claim 36, wherein said confirmation means confirms an idle state of a communication channel.

39. The method according to claim 38, wherein said confirmation means excludes the specific communication channel from the confirming operation if said confirmation means cannot confirm idle state of the specific communication channel for a predetermined number of times.

40. The method according to claim 36, wherein said apparatus performs communications by a TDD (Time Division Duplex) or TDMA (Time Division Multiple Access) method.

* * * * *

UNITED STATES PATENT AND TRADEMARK OFFICE
CERTIFICATE OF CORRECTION

PATENT NO.   : 5,867,790
DATED        : February 2, 1999
INVENTOR(S)  : Masashi Hamada It is certified that error appears in the above-identified patent and that said Letters Patent is hereby corrected as shown below:

Column 4, line 64, delete "forgetting" and insert therefor -- for setting --.

Column 20, line 1, delete "claim 17" and insert therefor -- claim 19 --.

Signed and Sealed this

Twenty-sixth Day of September, 2000

Attest:

Q. TODD DICKINSON

*Attesting Officer*     *Director of Patents and Trademarks*